United States Patent [19]

Adachi et al.

[11] Patent Number: 5,208,749
[45] Date of Patent: May 4, 1993

[54] METHOD FOR CONTROLLING ACTIVE SUSPENSION SYSTEM ON THE BASIS OF ROTATIONAL MOTION MODEL

[75] Inventors: Masao Adachi, Sagamihara; Naoyuki Ozaki, Katsuta; Makoto Shioya, Tokyo, all of Japan

[73] Assignee: Hitachi, Ltd., Tokyo, Japan

[21] Appl. No.: 563,348

[22] Filed: Aug. 7, 1990

[30] Foreign Application Priority Data

Aug. 11, 1989 [JP] Japan .................................. 1-208759

[51] Int. Cl.⁵ ........................ B60G 21/00; B60G 17/00
[52] U.S. Cl. ........................ 364/424.05; 364/426.01; 280/707; 280/702
[58] Field of Search .................. 364/424.05, 426.01, 364/434, 463; 280/707, 688, 702, 703

[56] References Cited

U.S. PATENT DOCUMENTS

| | | | |
|---|---|---|---|
| 4,625,993 | 12/1986 | Williams et al. | 280/707 |
| 4,741,554 | 5/1988 | Okamoto . | |
| 4,887,840 | 12/1989 | Harara et al. | 280/707 |
| 4,888,696 | 12/1989 | Akatsu et al. | 364/424.05 |
| 4,949,262 | 8/1990 | Buma et al. | 364/424.05 |
| 4,973,079 | 11/1990 | Tsukamoto | 280/707 |
| 4,975,849 | 12/1990 | Ema | 364/424.05 |

FOREIGN PATENT DOCUMENTS

| | | |
|---|---|---|
| 0213020 | 7/1986 | European Pat. Off. . |
| 0285153 | 3/1988 | European Pat. Off. . |
| 0286072 | 4/1988 | European Pat. Off. . |
| 0318713 | 11/1988 | European Pat. Off. . |
| 0318932 | 11/1988 | European Pat. Off. . |
| 0306003 | 3/1989 | European Pat. Off. . |
| 3708294 | 3/1987 | Fed. Rep. of Germany . |
| 63-242707 | 10/1988 | Japan . |
| 63-269709 | 11/1988 | Japan . |
| 2155206 | 1/1985 | United Kingdom . |
| 2206551 | 6/1987 | United Kingdom . |

*Primary Examiner*—Parshotam S. Lall
*Assistant Examiner*—Edward Pipala
*Attorney, Agent, or Firm*—Antonelli, Terry, Stout & Kraus

[57] ABSTRACT

In order to cope appropriately with transient changes in the rotational angle of a vehicle body in various traveling states of the vehicle body, the rotational angle of the vehicle body is presumed on the basis of a beforehand stored equation of motion on the vehicle body and a sensed value of an acceleration of the vehicle body and supply of a fluid to suspension cylinders is controlled in accordance with the presumed rotational angle.

9 Claims, 12 Drawing Sheets

METHOD FOR CONTROLLING ACTIVE SUSPENSION SYSTEM ON THE BASIS OF ROTATIONAL MOTION MODEL

BACKGROUND OF THE INVENTION

The present invention relates to control of a suspension system of an automobile and more particularly to an active suspension control method for controlling an active suspension system by injection or discharge of a fluid into or from suspension cylinders.

Conventionally, suspension cylinders are controlled by feedback of control based on lateral acceleration or vertical acceleration of a sprung mass supported above each suspension cylinder or by feed forward control based on steering angle or vehicle speed. These types of techniques and related techniques are disclosed, for example, in Japanese Patent Un-examined Publications JP-A-63-242707 and JP-A-63-269709.

The conventional active suspension control methods for suspension cylinder control have the following problems:

(i) They do not allow for the transient roll and pitch characteristics of a vehicle body during vehicle traveling, and so a control command from a controller cannot clearly follow changes in the roll and pitch angles.

(ii) They do not allow for changes in the attitude of the vehicle body caused by different kinds braking, such as engine braking, foot braking or hand braking, and so changes in the pitch angle cannot be sufficiently suppressed.

(iii) They do not allow for the information from an acceleration sensor when the vehicle body is tilted, and so cannot sufficiently suppress changes in the attitude of the vehicle body when the same is tilted, for example, on a slope.

(iv) They do not allow for manual control of active suspensions and cannot adjust the lengths of the suspension cylinders when the vehicle is at a stop.

(v) They do not allow for changes in the energy required for operation of the suspension cylinders, and the discharge and so injection of fluid from and into the suspension cylinders do not closely follow rapid changes in the attitude of the vehicle body.

(vi) They do not allow for the inability to control the suspension cylinders caused by the failure of means for feeding fluid to the suspension cylinders or breakage of a main fluid tank.

SUMMARY OF THE INVENTION

It is an object of the present invention to provide an effective, economical high-safety active suspension control method which solves those problems which are inherent in the conventional techniques, copes appropriately with transient changes in the roll and pitch angles in various traveling states of the vehicle body and also provides for manual adjustment of the attitude of the vehicle body.

In order to achieve the above object, the inventive active suspension control method has the following features:

(1) In a vehicle having a fluid supply unit for discharging and injecting fluid from and into suspension cylinders disposed at the respective wheels of the vehicle, a main tank for storage of fluid, an acceleration sensor for sensing an acceleration acting on the vehicle body during traveling and a controller for control of the fluid supply unit in accordance with the signal from a sensor, an equation of motion representing the rotation of the vehicle body is stored beforehand, the rotational angle of the vehicle body is presumed on the basis of the equation of motion and an acceleration signal from the acceleration sensor, and the fluid supply unit is controlled in accordance with the presumed rotational angle to thereby control the rotational angle of the vehicle body.

(2) The presumed rotational angle is corrected with a signal from a vertical acceleration sensor.

(3) A brake pressure sensor is provided which determines whether the vehicle is being braked by foot or by the engine when the vehicle is in a braked state. The value of the presumed rotational angle is corrected with a signal from the brake pressure sensor.

(4) A roll angle sensor which senses the roll angle of the vehicle body and a pitch angle sensor which senses the pitch angle of the vehicle body are provided. The presumed rotational angle obtained from the acceleration sensor is corrected with signals from the roll and pitch angle sensors.

(5) The controller calculates the energy required for discharge and injection of fluid by the fluid supply unit and changes the capability of supply of fluid to the suspension cylinders in accordance with the results of the calculation.

(6) Provided on the vehicle body are a fluid path opening and closing unit which controls the discharge and injection from and into the main tank in accordance with commands from the controller and a main tank pressure sensor which senses the pressure in the main tank. When the pressure in the main tank as indicated by the signal from the main tank pressure sensor is lower than a predetermined value, the fluid path opening and closing unit is closed to stop the discharge and injection of fluid.

(7) Provided on the vehicle body is an active suspension operating unit which is operated by the driver in the vehicle compartment to adjust the attitude of the vehicle body arbitrarily when the vehicle is at a stop.

(8) Vehicle height sensors are provided at the corresponding wheels of the vehicle instead of the vertical acceleration sensors to adjust the presumed rotational angles with signals from the height sensors.

(9) In the closing operation of the fluid path opening and closing unit of the item (6), the controller returns the vehicle heights at the corresponding wheels to the original values and then starts to close the fluid path opening and closing unit.

In the item (1), a presumption equation obtained from the equation of motion on the vehicle body rotation presumes a change in the rotational angle of the vehicle body from the acceleration acting on the vehicle body. Thus, the suspension cylinders act to suppress changes in the attitude of the vehicle body and particularly suppresses such changes highly even in a transient traveling state.

In the items (2) and (8), the presumed value of rotational angle of the vehicle body is prevented from failure of indication of the actual roll or pitch angle due to changes in the characteristics of the vehicle and the suspensions.

The actual roll or pitch angle is sensed from the vehicle heights. Changes in the characteristics of the vehicle body are calculated from a deviation of the actual roll or pitch angle from the pressured value. The parameters of the presumption equation are adjusted with the calculated changes, so that changes in the attitude angle of the vehicle body are suppressed even if changes in the characteristics, such as a change in the load on the vehicle, occur.

The item (3) allows for the difference between pitching torques occurring when the braking methods used at the same longitudinal accelerations differ, using a signal from the sensor which senses the braked state. This difference prevents the pitch angle from changing.

In the item (4), the actual acceleration component included in a signal from the acceleration sensor is separated using a signal from the attitude angle sensor. Thus, the acceleration is sensed correctly to prevent possible control based on wrong information.

In the item (5), energy required for control of the suspension cylinders is presumed on the basis of signals from the sensors provided at respective required positions in the vehicle body and the extent of operation of the actuators. A signal is output which generates an engine output corresponding to the presumed required energy, so that a rapid response to a rapid change in the attitude of the vehicle body is provided to maintain the control capability constant.

In the items (6) and (9), if a signal from the pressure sensor in the main tank indicates a pressure lower than a predetermined value for a given interval, the controller determines that an uncontrollable state occurs and gives a command to close all the flow control valves to thereby stop the functions of the active suspensions and hence to increase safety.

In the item (9), a signal from the manual operation unit is used for calculation of a quantity of operation to control the flow of fluid instead of the acceleration signal. Thus, any attitude of the vehicle body can be realized when the vehicle is at a stop.

DESCRIPTION OF THE PREFERRED EMBODIMENTS

Figure 1:
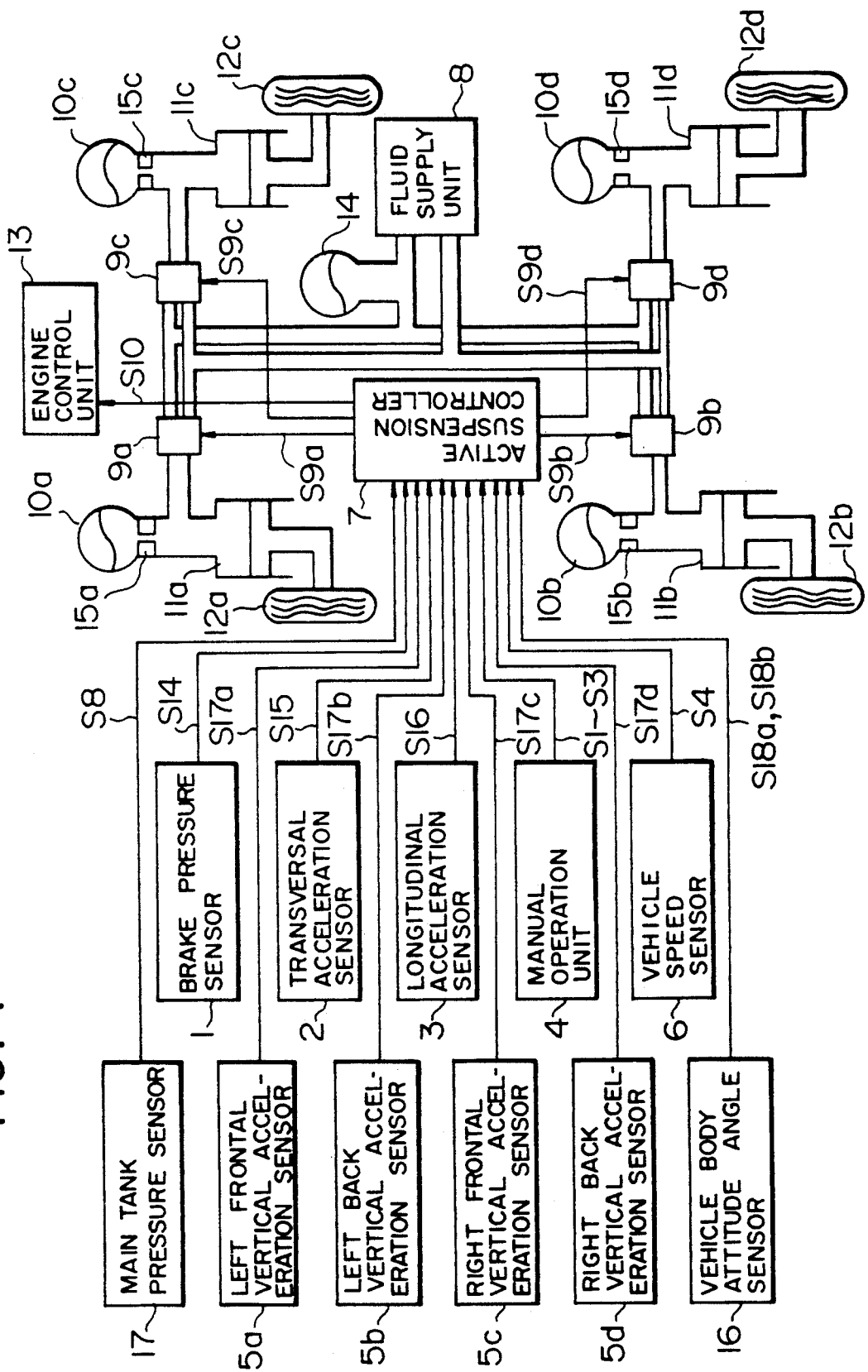
FIG. 1 is a schematic diagram of an active suspension control system to which the present invention is applied.

FIG. 1 is a block diagram of an active suspension control apparatus to which the present invention is applied. The apparatus includes a brake pressure sensor 1, a transversal acceleration sensor 2 which senses an acceleration which acts transversally on the traveling vehicle, a longitudinal acceleration sensor 3 which senses an acceleration which acts in the longitudinal direction on a traveling vehicle, a manual operation unit 4 provided in the vehicle compartment in which the user manipulates the attitude of the vehicle body, four vertical acceleration sensors 5a-5d for sensing vertical accelerations of the vehicle body at the corresponding wheels, a vehicle speed sensor 6 which senses the traveling speed of the vehicle, an active suspension controller 7 which controls a vehicle body attitude changing unit on the basis of the respective signals from the sensors, a fluid supply unit 8 which supplies fluid to suspension cylinders to be described in more detail later, valve control units 9a-9d which control the passage of fluid, fluid spring chambers 10a-10d, suspension cylinders 11a-11d the lengths of which are adjusted by injecting and discharging fluid thereinto and therefrom, wheels 12a-12d, an engine control unit 13 which controls the output of the engine, etc., a main fluid tank 14 which maintains the fluid at high pressure, fluid path resistance generators 15a-15d, a vehicle body attitude sensor 16 which senses the attitude of the vehicle body, and a main tank pressure sensor 17 which senses the pressure in the main fluid tank 14.

The active suspension controller 7 receives from the respective sensors the following pieces of information: namely, braked state information S14 from the brake pressure sensor 1, transversal acceleration information S15 on the transversal acceleration acting on the vehicle body from the transversal acceleration sensor 2, longitudinal acceleration information S16 from the longitudinal acceleration sensor 3, manual operation commands S1–S3 from the manual operation unit 4, vehicle speed information S4 from the vehicle speed sensor 6, information S8 on the pressure of fluid in the main fluid tank 14 from the main tank pressure sensor 17, pieces of information S17a–S17d on vertical acceleration from vertical acceleration sensors 5a–5d, and roll angle information S18a and pitch angle information S18b relating to the vehicle body from the vehicle body attitude angle sensor 16.

On the basis of the above pieces of information, the active suspension controller 7 outputs flow rate designating signals S9a–S9d to the valve control units 9a–9d which control the injection and discharge of fluid into and from the suspension cylinders 11a–11d and outputs a signal S10 to the engine control unit 13 to change the engine output in accordance with flow rate.

The suspension cylinders 11a-11d position the body with respect to the wheels 12a-12d vertically in accordance with commands from the active suspension controller 7.

Figure 2:
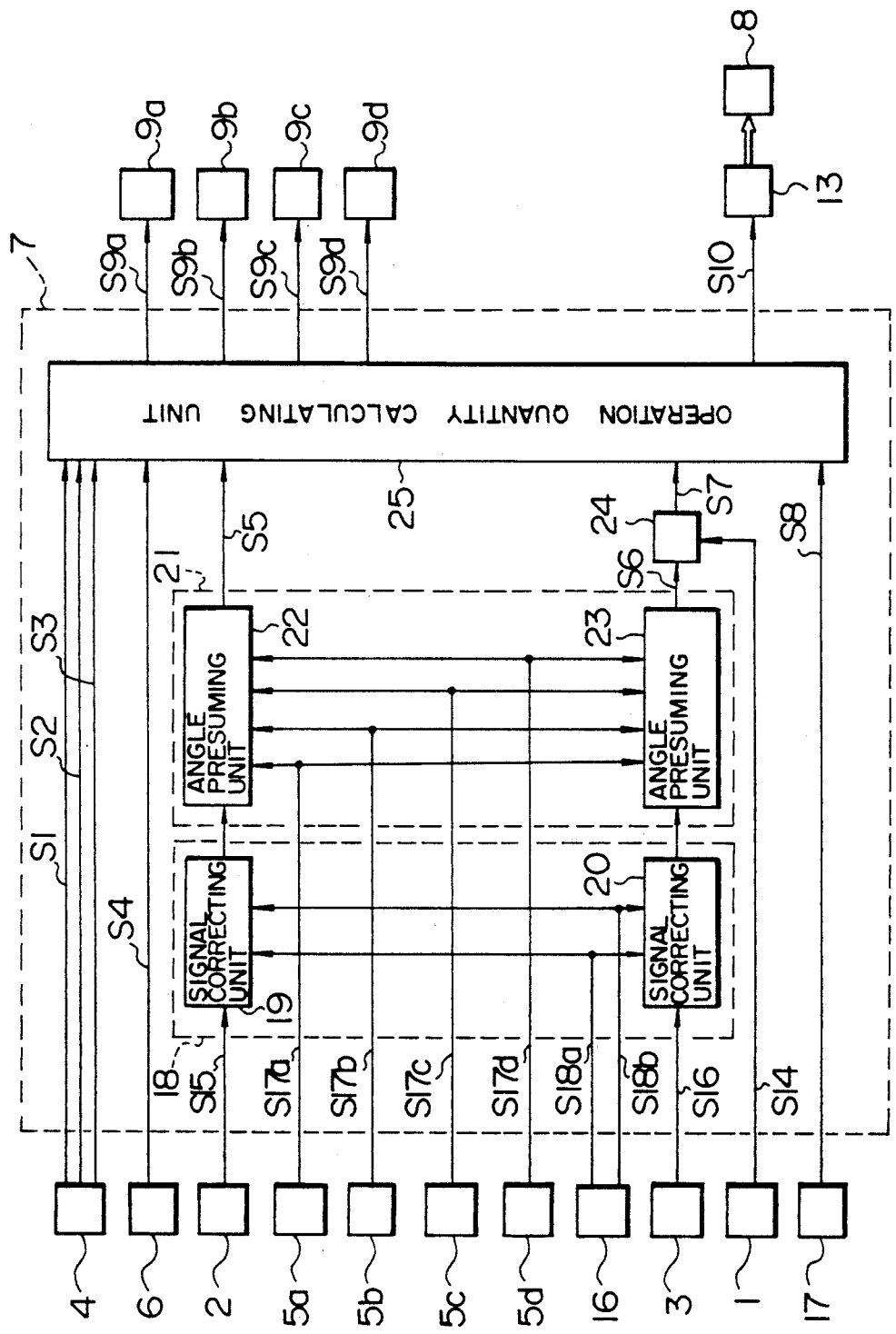
FIG. 2 is a block diagram of the active suspension controller of FIG. 1.

FIG. 2 is a block diagram of the active suspension controller of FIG. 1. The active suspension controller 7 includes an acceleration signal correction unit 18 which corrects the acceleration signal, an attitude angle presuming unit 21 comprising a roll angle presuming unit 22 which produces the presumed roll angle value and a pitch angle presuming unit 23 which produces the presumed pitch angle value, a pitch angle correcting unit 24 which corrects the presumed pitch angle according to the braked state, and an operation quantity calculating unit 25 which generates and supplies a flow designating signal to the valve control units 9a-9d and an engine output adjusting signal to the engine control unit 13.

The engine control unit 13 of FIG. 1 is connected with the fluid supply unit 8 and increases the engine output and the output of the fluid supply unit 8 in response to an output increase command from the active suspension controller 7 so as to supply enough fluid to the suspension cylinders 11a-11d. Conversely, in response to an output decrease command from the active suspension controller 7, the engine control unit 13 decreases the engine output and the output of the fluid supply unit 8.

Control of the roll angle in the active suspension control unit of FIGS. 1 and 2 is provided as follows: The transversal acceleration information S15 from the transversal acceleration sensor 2 is corrected with vehicle body attitude angle information S18a and S18b in the transversal acceleration signal correcting unit 19 of the acceleration signal correcting unit 18, the resulting signal is input to the roll angle presuming unit 22 of the attitude angle presuming unit 21 to calculate the presumed value S5 of the roll angle.

On the basis of the presumed value S5, the operation quantity calculating unit 25 calculates flow and required energy and outputs flow designating signals S9a-S9d and an engine output adjusting signal S10.

Control of the pitch angle is provided as follows: Longitudinal acceleration information S16 from the longitudinal acceleration sensor 3 is corrected with vehicle body attitude angle information S18a and S18b in the longitudinal acceleration signal correcting unit 20 of the acceleration correcting unit 18 and the resulting signal is input to the pitch angle presuming unit 23 of the attitude angle presuming unit 21 for calculating the presumed pitch angle value S6, which is then corrected with brake pressure information S14 in the pitch angle correcting unit 24 and the resulting signal is input to the operation quantity calculating unit 25 to be subjected to processing similar to that in the case of the roll angle.

Figure 3:
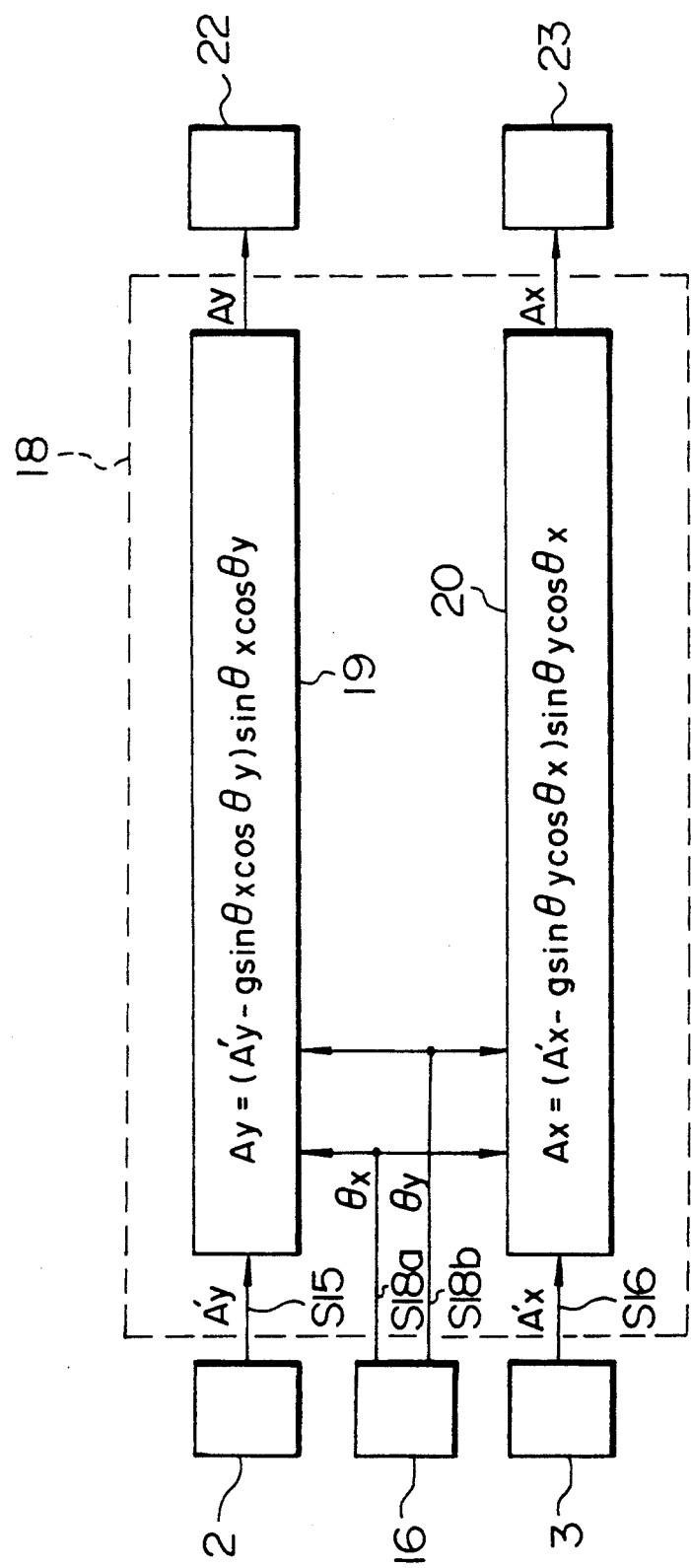
FIG. 3 is a block diagram indicative of the operation and structure of the acceleration signal correcting unit of FIG. 1.

FIG. 3 is a block diagram indicative of the operation and structure of the acceleration signal correcting unit 18.

The unit 18 includes transversal acceleration correcting unit 19 and longitudinal acceleration correcting unit 20, and is connected to transversal acceleration sensor 2, longitudinal acceleration sensor 3, vehicle body attitude angle sensor 16, roll angle presuming unit 22 and pitch angle presuming unit 23.

The vehicle attitude angle sensor 16 senses the attitude angles $\theta x$ and $\theta y$ of the vehicle body in the x and y directions.

The signals from the transversal and longitudinal acceleration sensors 2 and 3 contain a gravity component which depend on the attitude angle of the vehicle body and is different in direction from the actual acceleration acting on the vehicle body. Thus, the signals A'y, A'x, from the sensors 2 and 3 are passed through the transversal and longitudinal acceleration correcting units 19 and 20 to provide accurate transversal and longitudinal accelerations Ay and Ax which are not dependent on the attitude of the vehicle.

Figure 4:
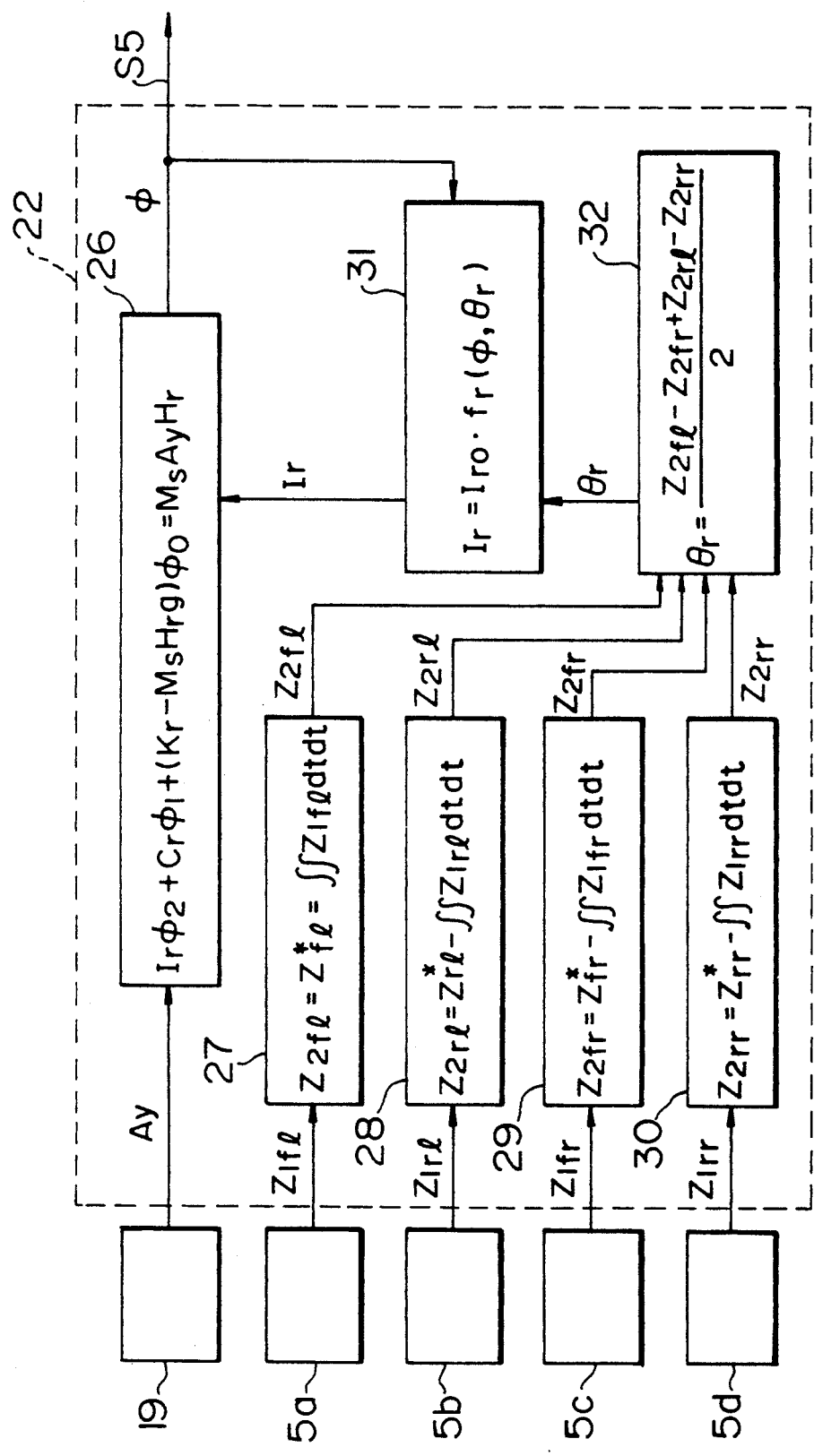
FIG. 4 is a block diagram indicative of the operation and structure of the roll angle presuming unit of FIG. 2.

FIG. 4 is a block diagram indicative of the operation and structure of the roll angle presuming unit 22 of the attitude angle presuming unit 21. The roll angle presuming unit 22 is connected to transversal acceleration correcting unit 19 and vertical acceleration sensors 5a-5d at the wheels, and include relative vehicle height calculating units 27-30 at the wheels, actual roll angle calculating unit 32, parameter correcting unit 31, and presumed roll angle value correcting unit 26.

Substituting the transversal acceleration signal Ay from the transversal acceleration correcting unit 19 into the following equation of motion, obtained from a model of roll motion:

$$Ir\phi_2 + Cr\phi_1 + (Kr - Ms \cdot Hr \cdot g)\phi_0 = Ms \cdot Ay \cdot Hr \qquad (1)$$

where
 Ir is the roll moment of inertia;
 $\phi_0$ is the roll angle;
 $\phi_1$ is the roll angular velocity;
 $\phi_2$ is the roll angular acceleration;
 Cr is the roll-equivalent damping coefficient;
 Kr is the roll stiffness;
 Ms is the on-sprung weight;
 Hr is the distance between roll axis centroids;
 g is the gravitational acceleration; and
 Ay is the lateral acceleration signal;
and solving the equation of motion (1) numerically, we obtain the presumed roll angle value.

Figure 15:
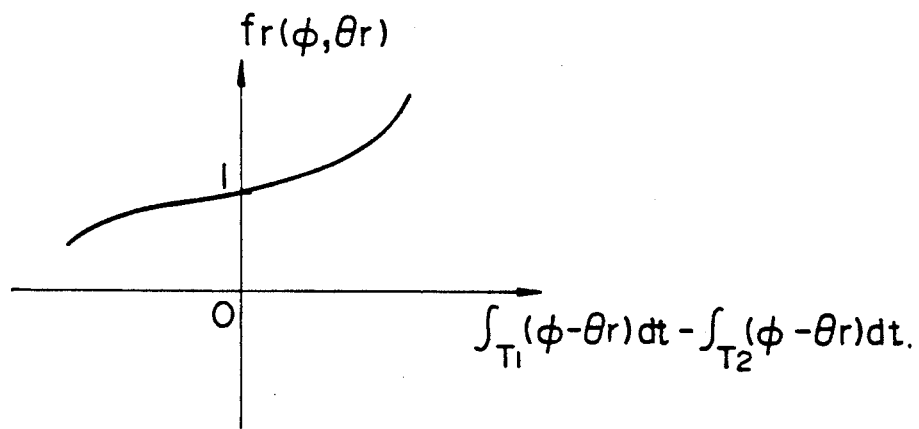
FIG. 15 shows one example of a function $f_r(\phi, p74_y)$ in the block 31 of FIG. 4.

The actual roll angle calculating unit 32 of the roll angle presuming unit 22 calculates the actual roll angle Or on the basis of relative vehicle heights $Z_{2fl}$, $Z_{2rl}$, $Z_{2fr}$, $Z_{2rr}$ obtained by passing vertical acceleration signals $Z_{1fl}$, $Z_{1rl}$, $Z_{1fr}$, $Z_{1rr}$ from the on-spring vertical acceleration sensors 5a-5d at the wheels through the relative vehicle height calculating units 27-30, and the roll moment Ir of equation of motion (1) is corrected with the actual roll angle $\theta r$ and the presumed roll angle value $\phi$. The function $fr(\phi, \theta_r)$ which is the roll moment correcting coefficient in FIG. 4 has a characteristic of FIG. 15 where the abscissa is given by $$\int T_1(\phi - \theta_r)dt - \int T_2(\phi - \theta_r)dt$$

where
 T$_1$ is an integrating interval comprising a time from Ay=0 to the next Ay=0;
 T$_2$ is an integrating interval comprising a time representing a half period of Ay after T$_1$.

By this construction, the roll angle is correctly presumed even if the motion characteristics of the vehicle body changes.

Information S5 on the presumed roll angle is output to the operation quantity calculating unit 25.

Figure 5:
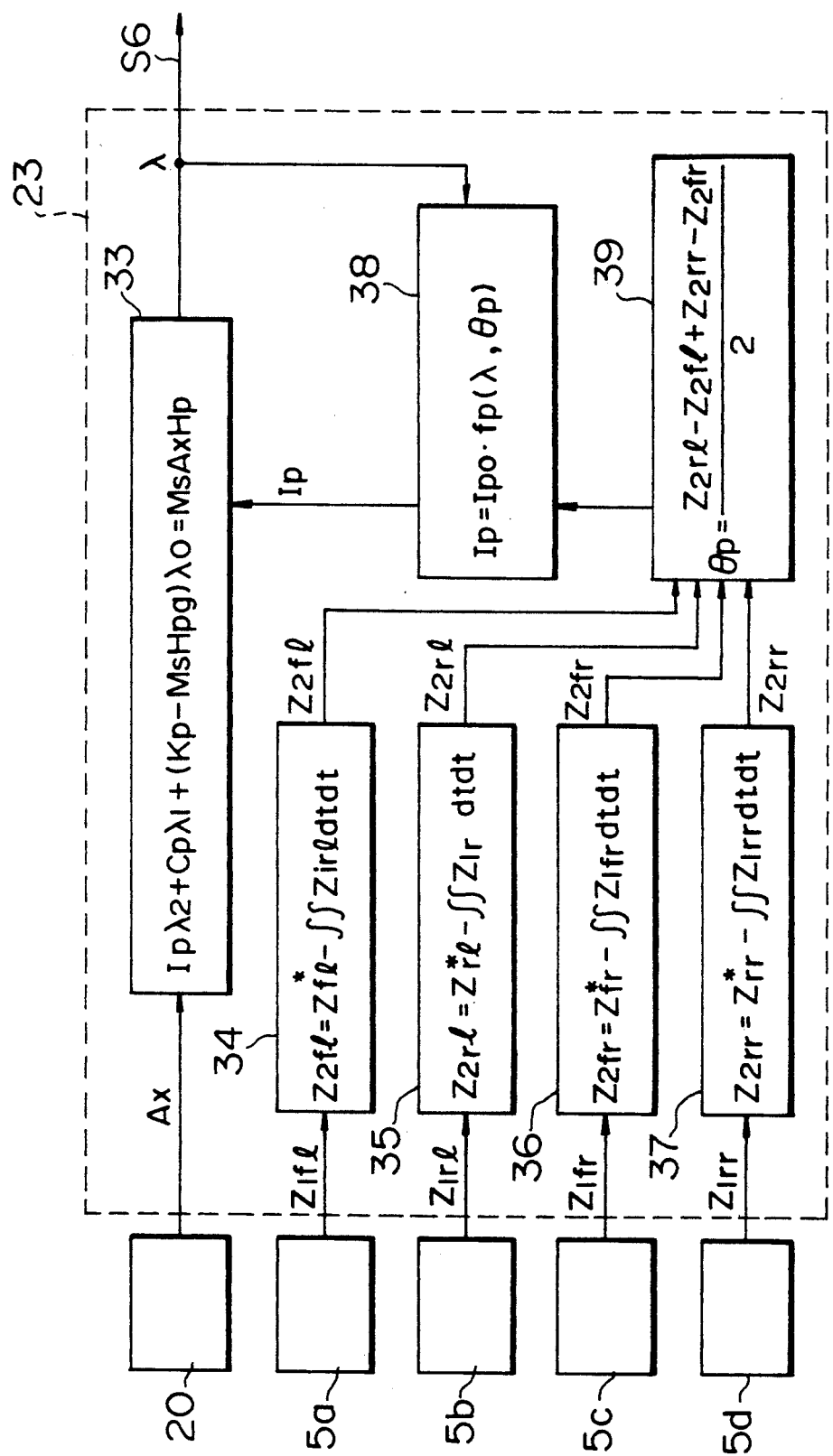
FIG. 5 is a block diagram indicative of the operation and structure of the pitch angle presuming unit of FIG. 2.

FIG. 5 is a block diagram indicative of the operation and structure of the pitch angle presuming unit 23 of the attitude angle presuming unit 21.

The pitch angle presuming unit is connected to longitudinal acceleration correcting unit 20 and vertical acceleration of sprung sensors 5a–5d, and includes wheel relative vehicle height calculating units 34–37, actual pitch angle calculating unit 39, parameter correcting unit 38, and pitch angle presuming unit 23.

Inserting the longitudinal acceleration signal Ax from the longitudinal acceleration correcting unit 20 into the following equation of motion obtained from a model of motion:

$$Tp\lambda_2 + Cp\lambda_1 + (Kp - Ms \cdot Hp \cdot g)\lambda_0 = Ms \cdot Ax \cdot Hp \quad (2)$$

where

Ip is the pitch moment of inertia;
$\phi_0$ is the pitch angle;
$\phi_1$ is the pitch angular velocity;
$\phi_2$ is the pitch angular acceleration;
Cp is the pitch-equivalent damping coefficient;
Kp is the pitch stiffness;
Hp is the distance between pitch axis centroids; and
Ms is the sprung weight;

and solving the equation of motion (2) numerically, we have a presumed value $\lambda$ of the pitch angle.

Figure 16:
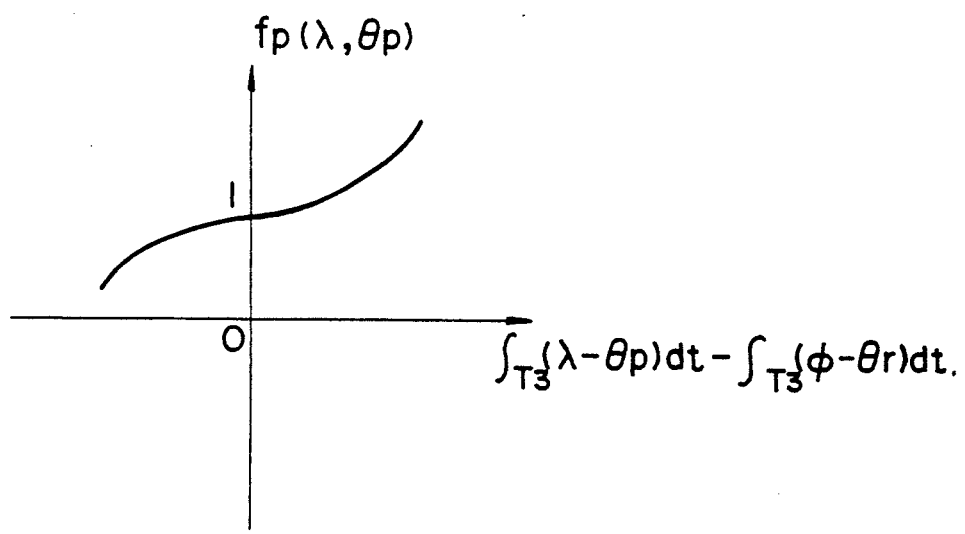
FIG. 16 shows one example of a function $f_p(\lambda, \theta_p)$ in the block 38 of FIG. 5.

Also, in the pitch angle presuming unit 23, the pitch moment Ip of the equation of motion (2) is corrected with the presumed value $\lambda$ and the actual pitch angle $\theta p$ obtained from vertical acceleration signals Z1fl, Z1rl, Z1fr, Z1rr as in the roll angle presuming unit 22. A function $f_p(\lambda, \theta p)$ comprising a pitch moment correcting coefficient in FIG. 5 has a characteristic shown in FIG. 16 where the abscissa of FIG. 16 is given by $$\int T_3(\lambda - \theta_p)dt - \int T_4(\lambda - \theta_p)dt$$

where $T_3$ is an integrating interval comprising a time from $Ax=0$ to the next $AX=0$; and
$T_4$ is an integrating interval comprising a time of a half period of Ax after $T_3$.

The presumed pitch angle information S6 is output to the manipulation quantity calculating unit 25.

Figure 6:
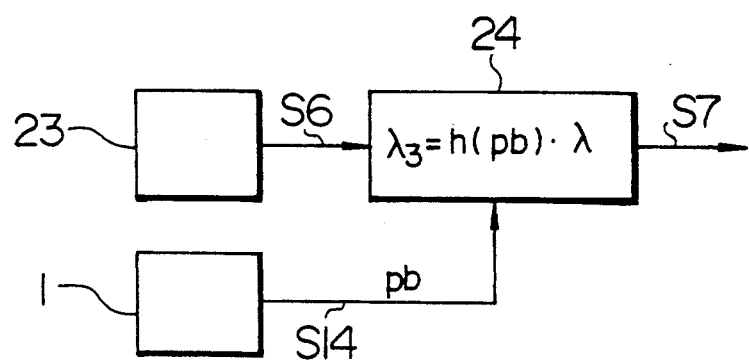
FIG. 6 is a block diagram indicative of the operation and structure of the pitch angle correcting unit of FIG. 2.

FIG. 6 is a block diagram indicative of the operation and structure of the pitch angle correcting unit 24. The pitch angle correcting unit 24 is connected to pitch angle presuming unit 23 and brake pressure sensor 1, and operates as a computing unit which processes received pieces of information.

The pitch angle correcting unit 24 corrects the presumed pitch angle information S6 from the pitch angle presuming unit 23 as a function of a signal Pb indicative of the intensity of foot braking from the brake pressure sensor 1 to provide the resulting signal $\lambda_3$.

Figure 7:
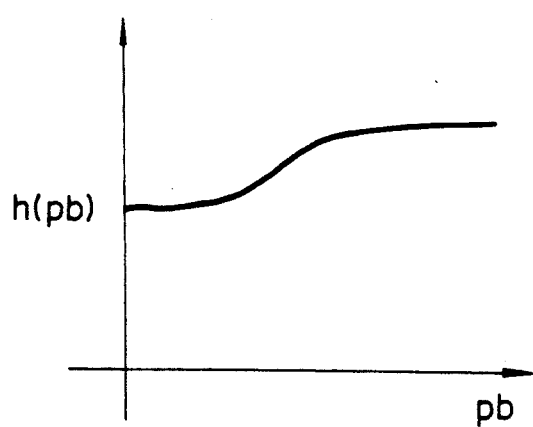
FIG. 7 is a graph showing the relationship between a signal pb indicative of the intensity of braking from the pitch angle correcting unit of FIG. 2 and a function h(pb) of the signal pb.

FIG. 7 is a graph of the relationship between signal Pb indicative of the intensity of foot braking and function h(Pb) of the signal Pb.

Figure 8:
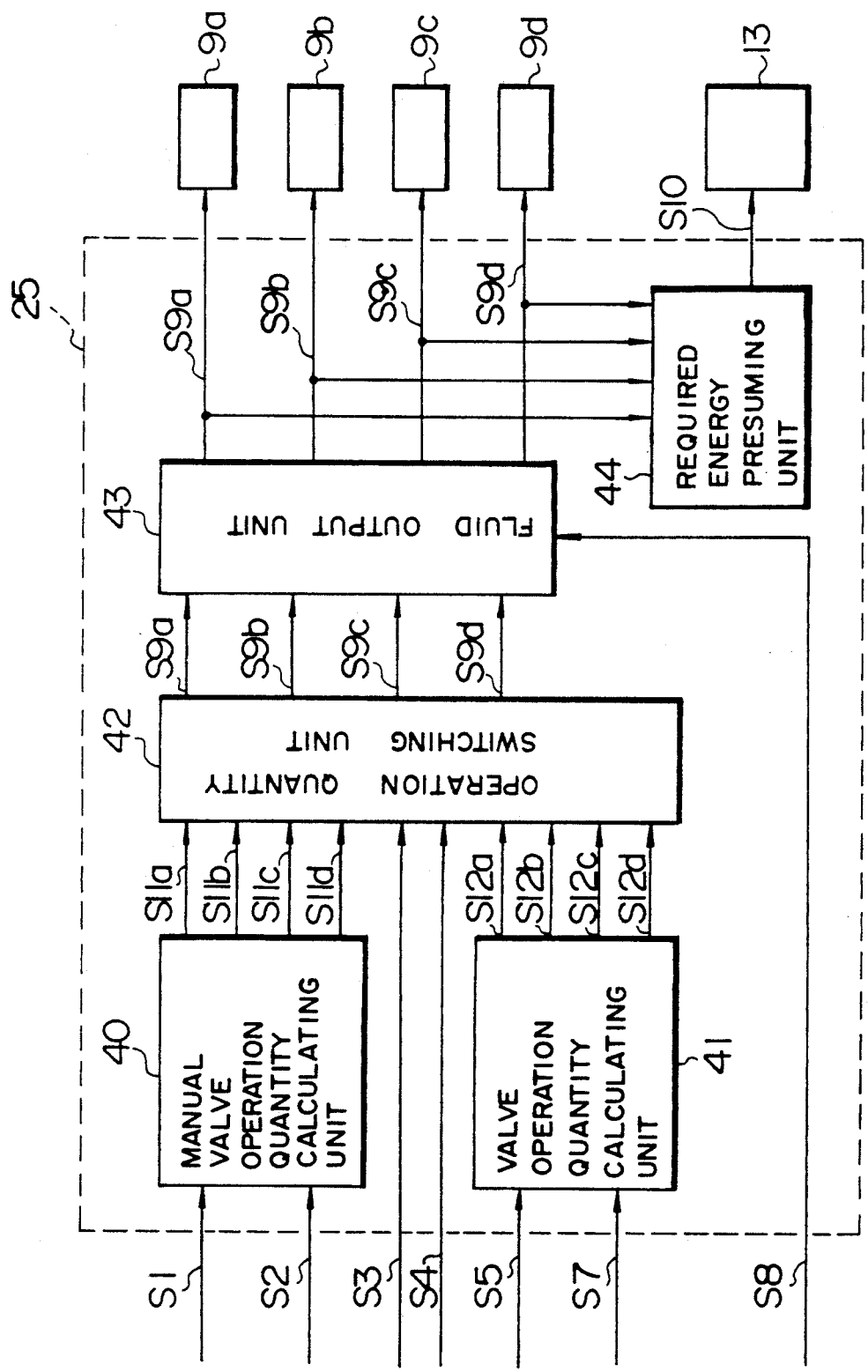
FIG. 8 is a block diagram indicative of the operation and structure of the operation quantity calculating unit of FIG. 2.

FIG. 8 is a block diagram of the operation and structure of the operation quantity calculating unit 25. The operation quantity calculating unit includes manual valve operation quantity calculating unit 40, valve operation quantity calculating unit 41, operation quantity switching unit 42, fluid output unit 43, and required energy presuming unit 44, and is connected to valve control units 9a–9d and engine control unit 13.

The manual valve operation quantity calculating unit 40 receives roll direction movement quantity information S1 and pitch direction movement quantity information S2 from the manual operation unit 4 and calculates flow designating signals S11a–S11d for manual operation.

The valve operation quantity calculating unit 41 receives presumed roll angle value information S5 and presumed pitch angle value information S7 instead of the roll direction movement quantity information S1 and pitch direction movement quantity information S2 and calculates flow designating signals S12a–S12d.

The operation quantity switching unit 42 receives switching signal S3 and vehicle speed information S4 from the manual operation unit 4 and determines whether the two kinds of flow designating signals S11, S12 should be used for valve control.

The fluid output unit 43 determines whether the signals determined by the operation quantity switching unit 42 should be output to the valve control units 9a–9d in accordance with a control stop designating signal S8 from the main tank pressure sensor 17.

The required energy presuming unit 44 presumes a required quantity of energy on the basis of flow designating signals S9a–S9d from the fluid output unit 43 and outputs a signal S10 to instruct the engine control unit 13 to increase the output in accordance with the presumed quantity.

Figure 9:
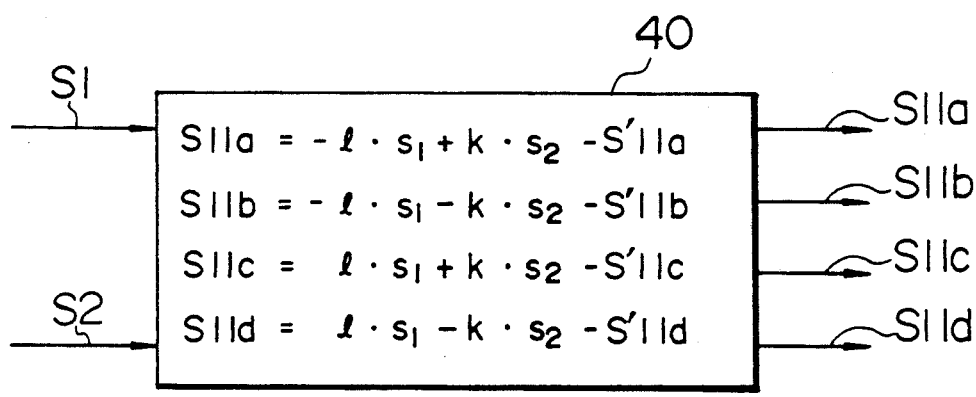
FIG. 9 is a block diagram indicative of the operation and structure of the manual valve operation quantity calculating unit of FIG. 8.

FIG. 9 is a block diagram indicative of the operation of the manual valve operation quantity calculating unit 40. The unit 40 calculates valve operation quantities S11a–S11d from roll and pitch direction movement quantities S1–S2 in accordance with the equations in FIG. 9. Reference characters S'11a–S'11d of FIG. 9 denote the values of S11a–S11d obtained one preceding sample interval before. Reference characters l and k each represent half of the wheel base.

Figure 10:
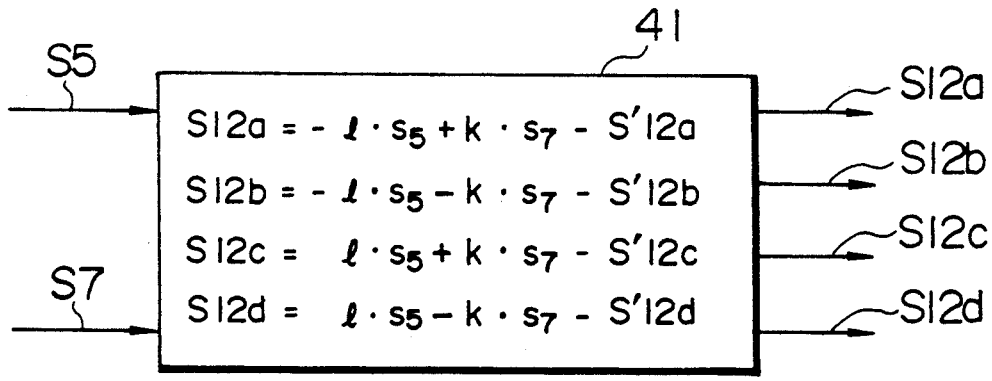
FIG. 10 is a block diagram indicative of the operation and structure of the valve operation quantity calculating unit of FIG. 8.

FIG. 10 is a block diagram of the operation of the valve operation quantity calculating unit 41. The unit 41 calculates valve operation quantities S12a–S12d using presumed roll and pitch angle information S5, S7 like the manual valve operation quantity calculating unit 40.

Figure 11:
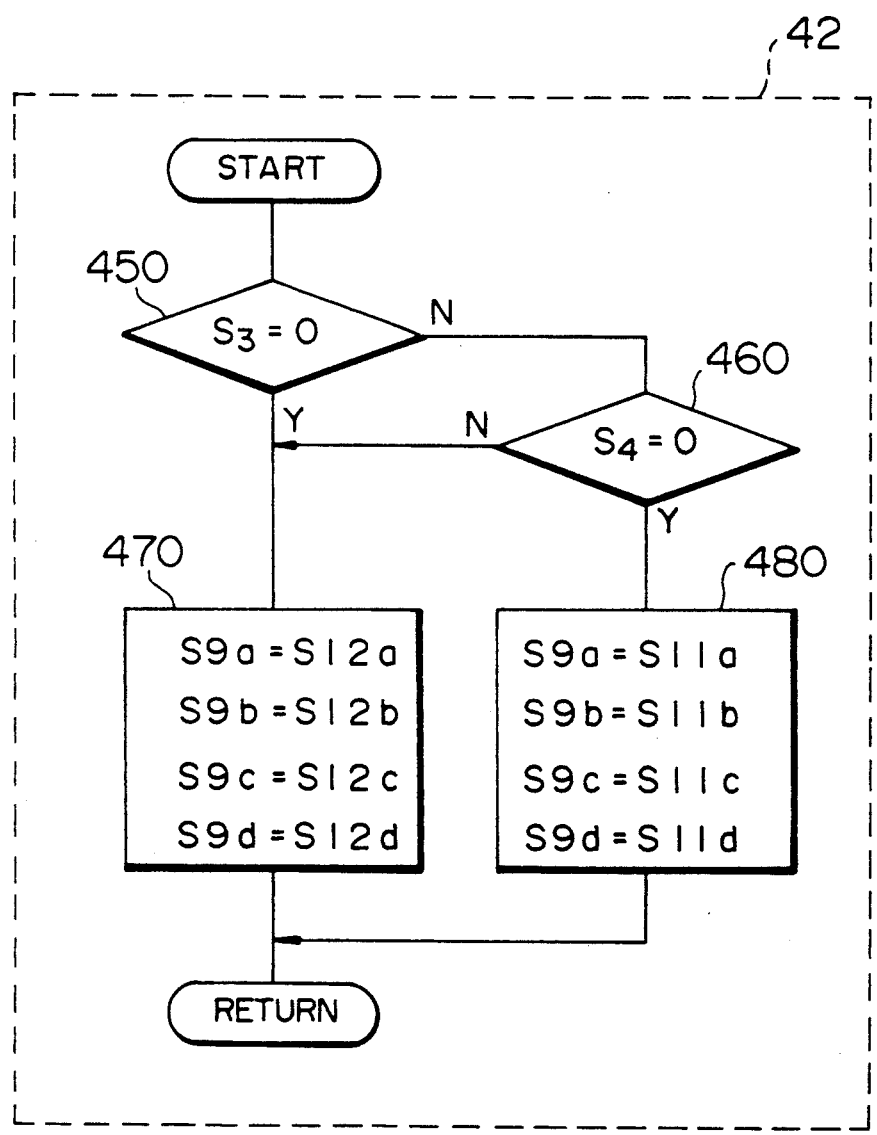
FIG. 11 is a flowchart indicative of the operation of the operation quantity switching unit of FIG. 8.

FIG. 11 is a flowchart indicative of the processing operation of the operation quantity switching unit 42. The manual operation unit 4 is set to output a manual switching designating signal S3 other than 0 only when the manual operation is performed. If S3 is not 0 (step 450) and vehicle speed information S4 is 0 (step 460), S11a–S11d are selected as valve operation quantities S9a–S9d (step 480). If otherwise, S12a–S12d are selected as valve operation quantities S9a–S9d (step 470) to permit manual operation.

Figure 12:
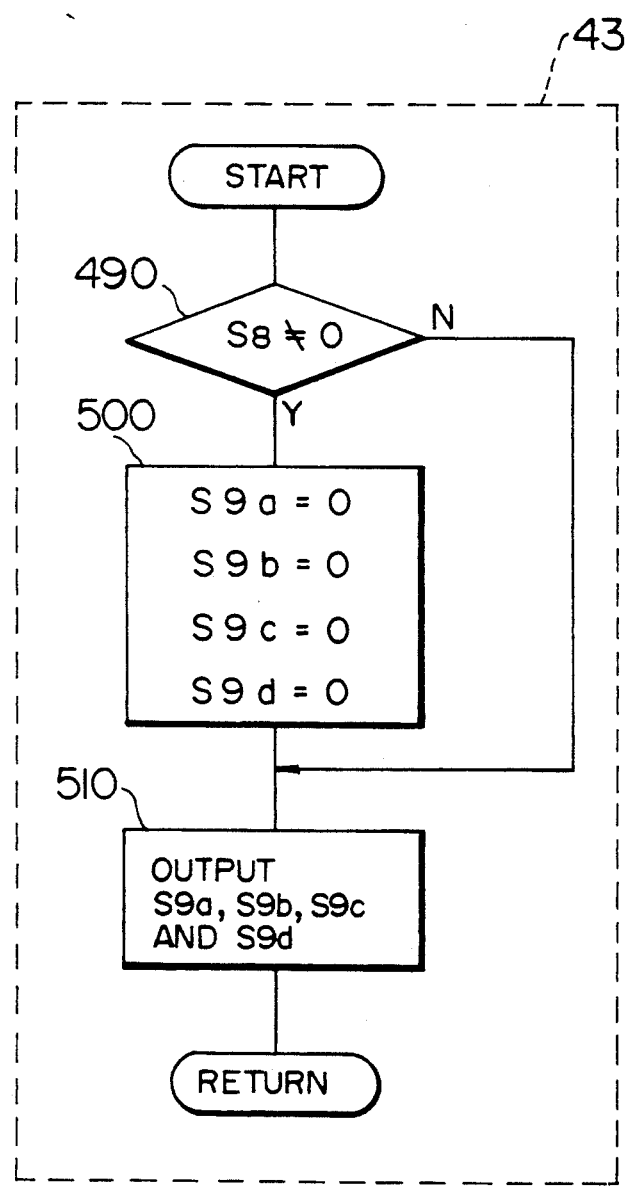
FIG. 12 is a flowchart indicative of the processing operation of the flow output unit of FIG. 8.

FIG. 12 is a flowchart indicative of the operation of the fluid output unit 43. The control designating signal S8 from the main tank pressure unit 17 has a value other than 0 when the main tank pressure is lower than a preset value for a given interval (step 490). In this case, all the valve operation quantities S9a–S9d are changed to 0 to inhibit valve control (step 500). If otherwise (step 490), the valve operation quantities S9a–S9d are output to the valve control units 9a–9d (step 510). Before valve control is inhibited, vehicle heights may be adjusted beforehand to the corresponding set references.

Figure 13:
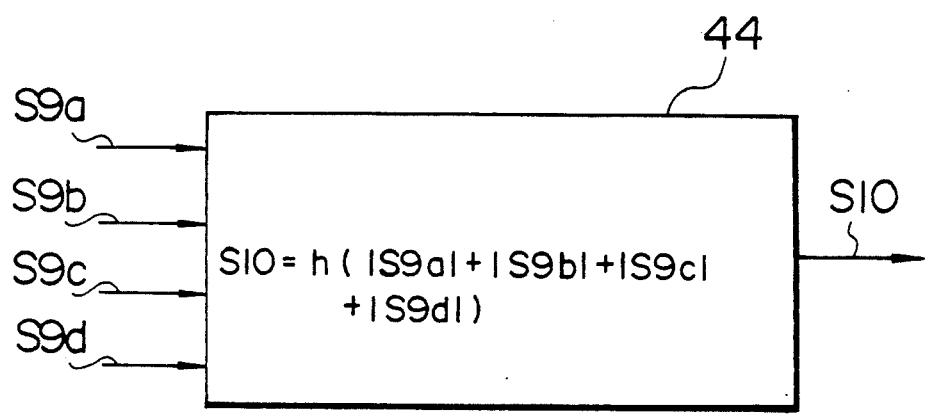
FIG. 13 is a block diagram indicative of the operation and structure of the required energy presuming unit of FIG. 8.

FIG. 13 is a block diagram indicative of the operation and structure the required energy presuming unit 44 which calculates required quantities of energy from the valve operation quantities S9a–S9d. The unit 44 calculates a signal S10 to the engine control unit 13 as a function of the sum of the absolute values of the valve operation quantities S9a–S9d. The engine control unit 13 receives a signal 10 indicative of an increment in the throttle opening to increase the engine output to thereby increase the fluid supply ability of the fluid supply unit 8.

Figure 14:
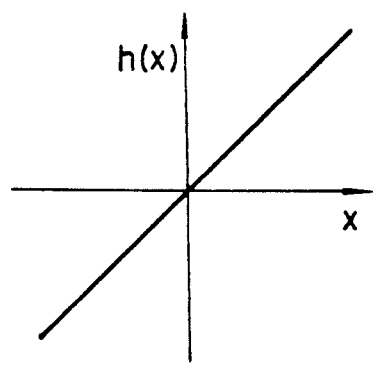
FIG. 14 is a graph of a function h(x) to calculate a signal S10 from the required energy presuming unit of FIG. 8.

FIG. 14 is a graph of a function h(x) for calculating the signal S10.

The active suspension control method which the present invention contemplates is realized by using the vehicle height sensors in substantially a similar manner to that mentioned above, instead of the vertical acceleration sensors of FIG. 1.

Thus, the present embodiment produces the following effects:

(1) Since the discharge and injection of fluid from and into the suspension cylinders will accurately follow the transient characteristic of the roll, a change in the roll angle is greatly reduced;

(2) Since the parameters of an equation of presumed roll angle are changed depending on vehicle heights, the presumed roll angle is corrected with suspension characteristic or load change;

(3) Since the discharge and injection of fluid from and into the suspension cylinders will accurately follow the transient pitch characteristic, a change in the pitch angle is greatly reduced;

(4) The presumed pitch angle is corrected with suspension characteristic or load change by changing the parameters of the equation of presumed pitch angle depending on vehicle height;

(5) Since the fluid designating signals to the suspension cylinders are corrected depending on the braked state, a change in the attitude during braking is greatly reduced;

(6) Even when the vehicle body is tilted, correct acceleration information is obtained and for example, a change in the attitude of the vehicle body is suppressed;

(7) Since the engine output changes following a change in the required energy for suspension control and the output of the fluid supply unit is changed, the control performance is improved when the attitude of the vehicle body is changed rapidly;

(8) Since suspension control is inhibited after vehicle height is adjusted when the fluid pressure in the main tank is low, safety is improved and engine output is suppressed when the fluid supply unit fails or when the main tank is broken; and (9) Since the suspension cylinders can be manually operated, the field of view is ensured when the vehicle starts forwardly or backwardly, and getting out of a snowy road or a muddy place is easy.

According to the present invention, transient changes in the roll and pitch angles in various traveling states of the vehicle are appropriately coped with and the attitude angle of the vehicle body can be manually adjusted. Thus, effective economical high-safety active suspension control is achieved.

What is claimed is:

1. An active suspension control method for controlling a vehicle active suspension system which includes a main tank for storing fluid, and suspension cylinders provided at wheels of the vehicle and connected to said main tank for being supplied with said fluid to control the attitude of the vehicle body, said method comprising the steps of:

sensing an acceleration acting on the body of the vehicle which is in a running state;

predicting a rotational angle of said vehicle body using a controller by solving a dynamic model equation of rotational motion of the vehicle mathematically according to a value of sensed acceleration and predetermined parameter coefficients of said model equation, said predicted rotational angle being provided as a control signal, wherein the dynamic model equation includes an equation for roll motion of:

$$Ir\phi_2 + Cn\phi_1 + (Kr - Ms \cdot Hr \cdot g)\phi_0 = Ms \cdot Ay \cdot Hr \ldots$$

where
Ir is the roll moment of inertia;
$\phi_0$ is the roll angle;
$\phi_1$ is the roll angular velocity;
$\phi_2$ is the roll angular acceleration;
Cr is the roll-equivalent damping coefficient;
Kr is the roll stiffness;
Ms is the on-sprung weight;
Hr is the distance between roll axis centroids;
g is the gravitational acceleration; and
Ay is the lateral acceleration signal;
and further includes the equation for pitch motion of:

$$Ip\lambda_2 + Cp\lambda_1 + (Kp - Ms \cdot Hp \cdot g)\lambda_0 = Ms \cdot Ax \cdot Hp \ldots$$

where
Ip is the pitch moment of inertia;
$\lambda_0$ is the pitch angle;
$\lambda_1$ is the pitch angular velocity;
$\lambda_2$ is the pitch angular acceleration;
Cp is the pitch-equivalent damping coefficient;
Kp is the pitch stiffness;
Hp is the distance between pitch axis centroids; and
Ms is the sprung weight; and
controlling the supply of fluid from said main tank to said suspension cylinders according to said control signal representing the predicted rotational angle of the vehicle body, wherein said predicting step includes the steps of detecting at least one roll angle and pitch angle of the vehicle body, and correcting a predicted rotational angle with a signal indicative of the detected angle, and correcting said parameter coefficients $I_R$ of the roll motion equation with the actual roll angle and the predicted roll angle, and/or correcting said parameter coefficient $I_p$ of the pitch motion equation with the actual pitch angle and the predicted pitch angle.

2. A method for controlling a vehicle active suspension system which includes a main tank for storing fluid, and suspension cylinders provided at wheels of the vehicle and connected to said main tank for being supplied with said fluid to control the attitude of the vehicle body, said method comprising the steps of:

sensing an acceleration acting on the body of the vehicle which is in a running state;

predicting a rotational angle of said vehicle body using a controller by solving a dynamic model equation of rotational motion of the vehicle mathematically according to a value of sensed acceleration and predetermined parameter coefficients of said model equation, said predicted rotational angle being provided as a control signal wherein the dynamic model equation includes the equation for roll motion of:

$$Ir\phi_2 + Cn\phi_1 + (Kr - Ms \cdot Hr \cdot g) = Ms \cdot Ay \cdot Hr \ldots$$

where
Ir is the roll moment of the inertia;
$\phi_0$ is the roll angle;

$\phi_1$ is the roll angular velocity;
$\phi_2$ is the roll angular acceleration;
Cr is the roll-equivalent damping coefficient;
Kr is the roll stiffness;
Ms is the on-sprung weight;
Hr is the distance between roll axis centroids;
g is the gravitational acceleration; and
Ay is the lateral acceleration signal; and further includes the equation for pitch motion of:

$$Ip\lambda_2 + Cp\lambda_1 + (Kp - Ms \cdot Hp \cdot g)\lambda_0 = Ms \cdot Ax \cdot Hp \ldots$$

where
Ip is the pitch motion of inertia;
$\lambda_0$ is the pitch angle;
$\lambda_1$ is the pitch angular velocity;
$\lambda_2$ is the pitch angular acceleration;
Cp is the pitch-equivalent damping coefficient;
Kp is the pitch stiffness;
Hp is the distance between pitch axis centroids; and
Ms is the sprung weight; and
controlling the supply of the fluid from said main tank to said suspension cylinders according to said control signal representing the predicted rotational angle of the vehicle body.

3. An active suspension control method according to claim 2, wherein said predicting step includes the steps of detecting a vertical motion of the vehicle body and correcting a predicted rotational angle of the vehicle body with a signal indicative of the detected vertical motion.

4. An active suspension control method according to claim 2, wherein said predicting step includes the steps of determining whether, when the vehicle body is in a braked state, it is braked by foot actuation of a brake system or engine operation, and correcting a predicted rotational angle with the result of said determining step.

5. An active suspension control method according to claim 2, wherein said controlling step includes the steps of calculating energy required for discharge and injection of fluid and changing the ability of supplying fluid to the suspension cylinders depending on the result of the calculation.

6. An active suspension control method according to claim 2, wherein said controlling step includes the steps of sensing the pressure in the main tank, determining whether the sensed pressure is lower than a predetermined value, and stopping the discharge and injection of fluid from and into the main tank when the pressure in the main tank is lower than said predetermined value.

7. An active suspension control method according to claim 2, wherein said controlling step includes the step of controlling the supply of fluid too said suspension cylinders according to a driver's order in a compartment of the vehicle body to adjust the attitude of the vehicle body when the vehicle is at a stop.

8. An active suspension control method according to claim 2, wherein said predicting step includes the steps of detecting the height of the vehicle body and correcting a predicted rotational angle with a signal indicative of detected height.

9. An active suspension control method according to claim 6, wherein said predicting step includes the step of adjusting the vehicle heights at corresponding wheels to predetermined positions prior to starting to close a path for the fluid to and from the main tank.

* * * * *